June 15, 1965 W. O. ECKHARDT 3,189,839

HIGH SPEED AMPLIFYING MODULATION-DEMODULATION LOGIC

Filed Feb. 10, 1961 3 Sheets-Sheet 1

INVENTOR

WILFRIED O. ECKHARDT

BY

H. L. Gordon

AGENT

HIGH SPEED AMPLIFYING MODULATION-DEMODULATION LOGIC

Filed Feb. 10, 1961 3 Sheets-Sheet 2

INVENTOR
WILFRIED O. ECKHARDT
BY
H. L. Gordon
AGENT.

June 15, 1965 W. O. ECKHARDT 3,189,839
HIGH SPEED AMPLIFYING MODULATION-DEMODULATION LOGIC
Filed Feb. 10, 1961 3 Sheets-Sheet 3

INVENTOR
WILFRIED O. ECKHARDT
BY H. L. Gordon
AGENT.

United States Patent Office 3,189,839
Patented June 15, 1965

3,189,839
HIGH SPEED AMPLIFYING MODULATION-DEMODULATION LOGIC

Wilfried O. Eckhardt, Malibu, Calif., assignor, by mesne assignments, to the United States of America as represented by the Secretary of the Navy Filed Feb. 10, 1961, Ser. No. 102,906
5 Claims. (Cl. 330—10)

This invention relates to a high speed amplifying modulation-demodulation scheme for ultra-high frequency digital computers and more particularly to a system for amplifying and performing logical operations with binary pulses having repetition rates of the order of one gigacycle and having time delays of a fraction of a nanosecond.

The maximum rate of information flow in logic circuits is strongly dependent on (a) the maximum pulse rate the components can handle and (b) the time the pulses are delayed between the input and output of the individual components. In the past, baseband or pulse systems have been used which required very wide band amplifiers from D.C. up to some multiple of the pulse repetition frequency and required expensive transistors or other components.

Radio frequency carrier systems such as parametric phase locked oscillators have also been proposed, but the slow build-up and the decay time of the oscillator circuits necessitated a relatively large ratio of the carrier frequency to the information frequency.

In accordance with this invention a radio frequency carrier of the order of ten gigacycles is used which is amplitude modulated by varying the capacitance of a semiconductor diode and then demodulated. The ratio between the carrier frequency and the signal repetition rate may be very small. Conventional demodulators using non-linear positive resistance elements have conversion loss. However, if the gain in the modulator exceeds the demodulator loss, net gain at the signal frequency (baseband) results. This gain exists between separate input and output ports and is unidirectional.

An ideal modulator with gain can be defined with the condition that the signal power required to achieve a given amount of modulation has to be independent of the carrier power and the signal frequency. In this case the gain is limited only by the available pump power and bandwidth is limited only by the necessity of avoiding overlapping of the signal frequency band with the lower side band of the modulated carrier. Furthermore, an ideal modulator introduces no time delay.

An object of this invention is therefore to perform logical operations at gigacycle rates.

Another object of this invention is to employ a non-linear reactive modulator to transform signal pulses from a baseband to a carrier level.

Another object of this invention is to amplify ultra-high-frequency pulses and to distribute them to a number of outputs.

Another object of this invention is to provide "And," "Or," and memory storage circuits for computers using gigacycle rates.

Other objects and many of the attendant advantages of this invention will be readily appreciated as the same becomes better understood by reference to the following detailed description when considered in connection with the accompanying drawings wherein.

Figure 1:
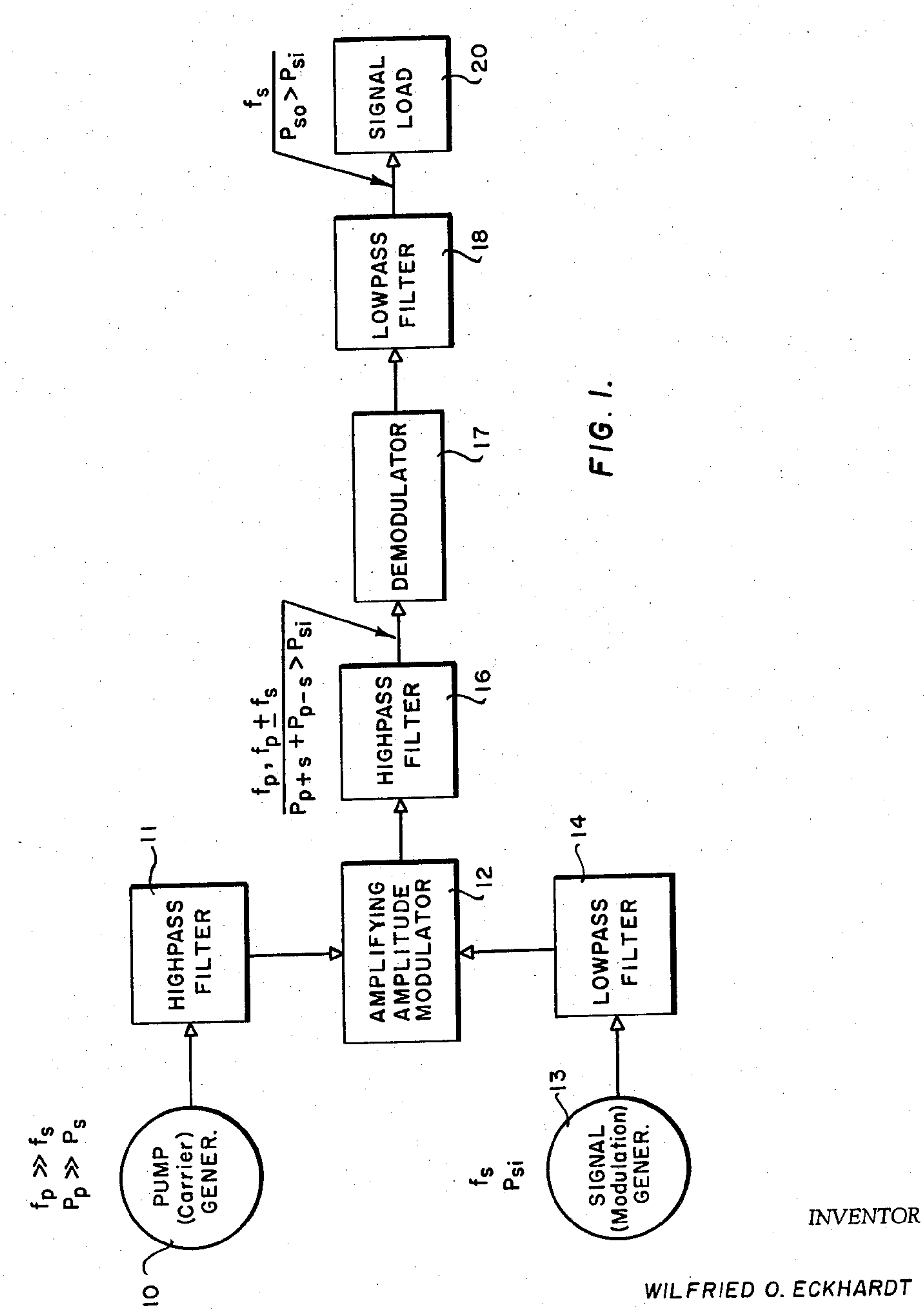
FIG. 1 is a block diagram of the modulation-demodulation scheme.

Referring to FIG. 1 the modulation-demodulation system uses a suitable amplifying amplitude modulator and a demodulator with suitable inputs and outputs.

As shown in FIG. 1 a pump generator 10 for an ultra-high frequency carrier $f_p$ is connected to a high pass filter 11 and applied to an amplifying amplitude modulator 12. Signal generator 13 applies a baseband or low frequency signal $f_s$ through low pass filter 14 to modulator 12. Signal $f_s$ varies the reactance of a variable reactor in modulator 12. The output of modulator 12, after passing through high pass filter 16, consists of the pump frequency $f_p$ and its double side band components $f_p \pm f_s$ and is detected in demodulator 17, and passed through low pass filter 18 in the amplifier as the reconstituted signal $f_s$, and then passed to the signal load 20.

In this system the delay time is roughly proportional to the distance between modulator 12 and demodulator 17 and can usually be made as small as necessary, i.e., one half nanosecond or less to thereby avoid a large logical delay time in this system.

A conversion loss exists in demodulator 17 but, as long as the gain of modulator 12 exceeds the loss of demodulator 17, a total gain through the system is achieved. As indicated on the drawing the power in the output signal, $P_{so}$, is greater than the input signal power, $P_{si}$.

As an example with a ten gigacycle pump, a 50-ohm signal generator, and a 50-ohm signal load, a voltage gain-bandwidth product of approximately 1500 megacycles or 6½ db gain with a one half nanosecond rise time and 3 db bandwidth from D.C. to 700 megacycles was achieved. The reverse loss under these conditions was 40 db, indicating that the gain of this circuit is indeed unidirectional.

Figure 2:
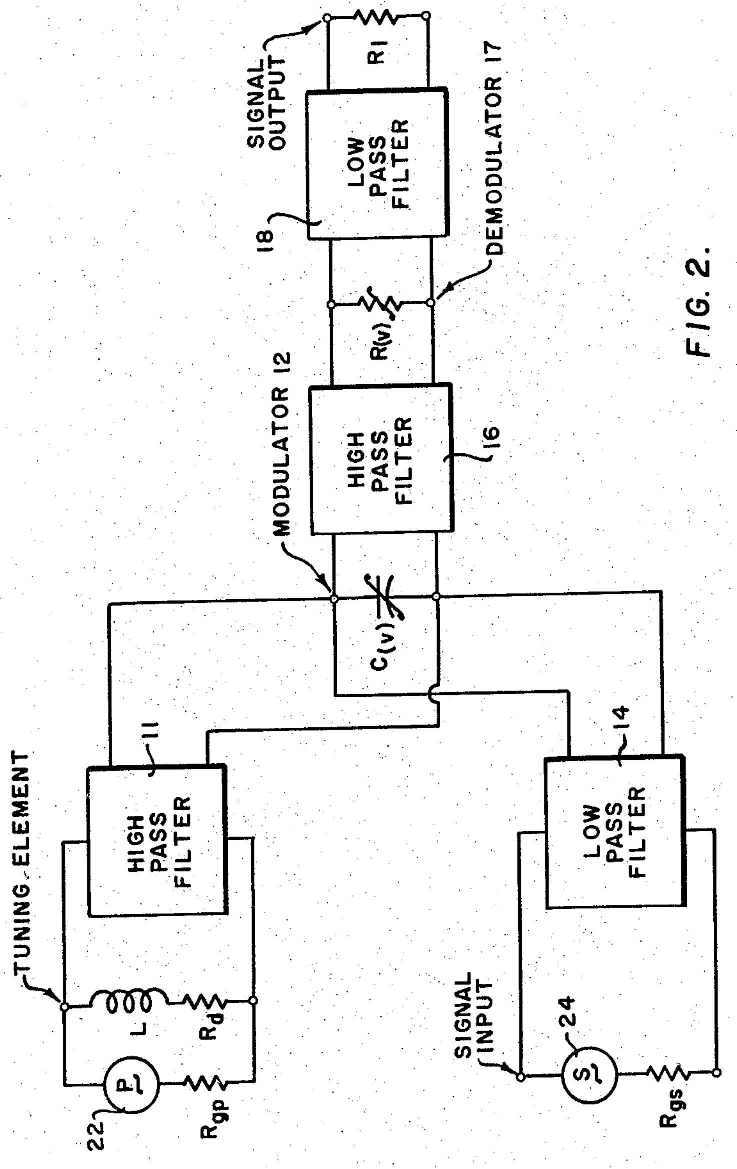
FIG. 2 is a schematic diagram of the modulation-demodulation scheme shown in FIG. 1.

As shown schematically in FIG. 2, the modulator 12 is matched by the tuning element, as indicated by inductance L and resistance $R_d$, to the pump generator 22, having an internal resistance $R_{gp}$. In an actual embodiment X band wave guide was used for high pass filters 11 and 16. As an example of an embodiment of the invention, modulator 12 used an RCA variable capacitance diode which is shown by the symbol $C_{(v)}$ that was switched from a high capacity region to a low capacity region for modulation of the carrier. A signal input source 24 having an internal resistance $R_{gs}$ is usually of a base band or binary pulse type and is therefore not tuned. Low pass filter 14 passes the base band signal to the modulator 12 diode $C_{(v)}$ while blocking the carrier signal $f_p$. The demodulator 17 diode indicated by $R_{(v)}$ was a type 1N1838.

As shown by FIGS. 3–6 the modulation-demodulation logic is flexible and can be used as a basis for digital computer type circuits.

Figure 3:
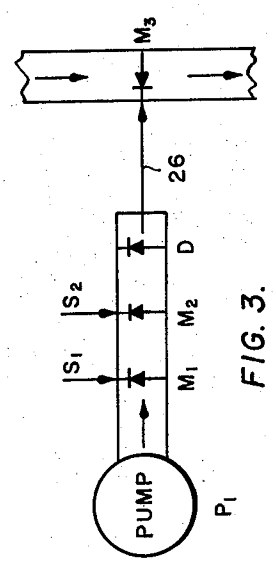
FIG. 3 is an "And" circuit for a digital computer employing modulation-demodulation principles.

Referring to FIG. 3 a pump $P_1$ is used to energize an "And" circuit consisting of modulator $M_1$ energized by signal $S_1$ and modulator $M_2$ energized by signal $S_2$ where the two base band signals are applied in series to the carrier flow. Therefore, when both modulators $M_1$ and $M_2$ have signal inputs, their combined output is passed to demodulator D which may then be used as a baseband output 26 or passed to another modulator $M_3$ for use in a carrier system.

Figure 4:
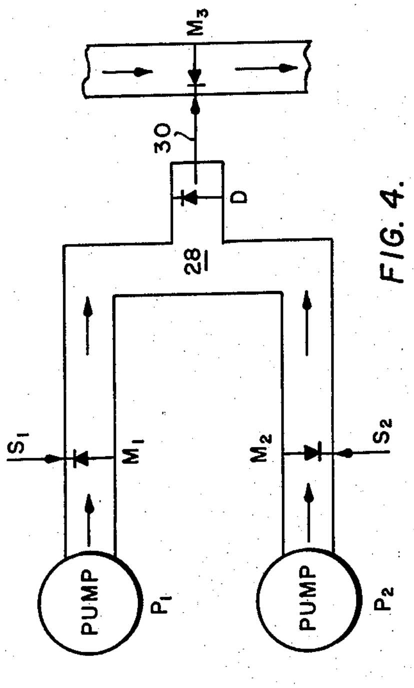
FIG. 4 is an "Or" circuit for a digital computer using the modulation-demodulation scheme.

As shown in FIG. 4 an "Or" circuit may be provided by having pumps $P_1$ and $P_2$ with their output modulated by modulators $M_1$ and $M_2$ with base band signals $S_1$ and $S_2$ respectively. The two modulated outputs are then combined in a T section 28 and summed in demodulator D to provide an output when either $S_1$ or $S_2$ are turned on.

A base band output 30 may be provided or changed to a carrier signal output by modulator $M_3$.

Figure 5:
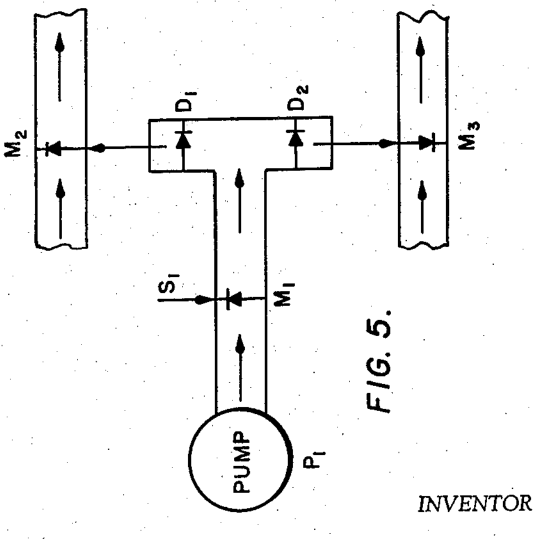
FIG. 5 is a symbolic drawing of signal distribution in a modulation-demodulation logic system.

As shown in FIG. 5 a signal distribution system is shown where pump $P_1$ is modulated by modulator $M_1$ with signal $S_1$. The $M_1$ output is then fed to demodulators $D_1$ and $D_2$. The resultant baseband outputs are then fed into modulators $M_2$ and $M_3$ in separate carrier lines.

Figure 6:
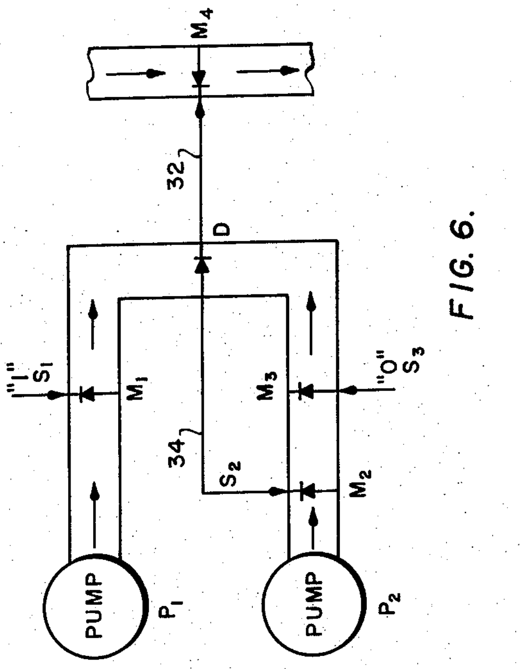
FIG. 6 is a symbolic drawing of a dynamic memory circuit for a digital computer employing the modulation-demodulation logic.

A dynamic memory element is shown in FIG. 6 where pump $P_1$ is modulated by a "1" input at diode $M_1$. The modulated output is detected at demodulator D and a carrier output is provided in modulator $M_4$ from the baseband output 32. A second-pump $P_2$ has an output applied to modulator $M_2$ and modulator $M_3$ in series which is connected to demodulator D. Thus, when a "1" input pulse is applied to $S_1$ and then detected at demodulator D, the output is applied on feedback or control line 34 to modulator $M_2$ and, as long as no "zero" input pulse is applied on $S_3$ to turn modulator $M_3$ off, the binary "one" will be circulated around the loop comprising demodulator D, modulators $M_2$ and $M_3$, and feedback line 34. The dynamic memory element as shown in FIG. 6 will therefore store a binary "1" as long as no "zero" input pulse is applied to modulator $M_3$. Similarly, if a "zero" input pulse is applied to $M_3$, the circuit will store the "zero" until the next "1" pulse is applied to $M_1$. Therefore the circuit forms a conventional storage of a "one" or "zero."

The maximum pulse rate is dependent upon the modulated pulse rise time which may be achieved and this rise time is dependent upon the diode capacity and stray circuit capacity for a given waveguide. An improved diode and holder provided a .2 nanosecond rise time which would allow 1 to 2 gigacycle rates with a 10 gigacycle carrier.

Obviously many modifications and variations of the present invention are possible in the light of the above teachings. It is therefore to be understood that within the scope of the appended claims the invention may be practiced otherwise than as specifically described.

What is claimed is:

1. A high speed AND logic circuit comprising:
a waveguide transmission line having an input end and an output end;
a pump source of electrical waves connected to the input end of said transmission line;
first and second reactive modulation means coupled in series in said transmission line;
a first source of base band signals coupled to said first reactive modulation means;
a second source of baseband signals coupled to said second reactive modulation means; and
reactive demodulation means coupled to said output end and responsive to the output of said second modulator, for producing a baseband signal output when and only when both said reactive modulation means have simultaneous outputs.

2. A high speed OR logic circuit comprising:
a waveguide transmission line having first and second input legs and an output leg;
a pump source of electrical waves connected to each of said first and second input legs;
respective reactive modulation means coupled to said first and second input legs;
a first source of baseband signals coupled to the reactive modulation means in said first input leg and a second source of baseband signals coupled to the reactive modulation means in said second input leg; and reactive demodulation means coupled to the output leg of said transmission line for producing a baseband signal output when either of said modulation means produces an output.

3. A high-speed OR logic circuit according to claim 2 wherein the pump source connected to said first input leg has characteristics identical to those of the pump source connected to said second input leg.

4. A dynamic-memory logic circuit comprising:
a waveguide transmission line having first and second input legs connected by an output cross leg;
respective pump sources of electrical waves, one of said sources being connected to said first input leg and the other of said sources being connected to second input leg;
respective input reactive modulation means coupled to said first and second input legs;
a first source of baseband signals connected to the input modulation means in said first input leg and a second source of baseband signals connected to the input modulation means in said second input leg;
said first source of baseband signals producing a signal distinctly different from said second source of baseband signals;
demodulation means coupled to said output cross leg for producing a baseband output;
further reactive modulation means coupled to said second input leg at a connection point thereof between its associated pump signal source and its said input reactive modulation means; and
electrically conductive feed back means connecting said demodulation means to said further modulation means for passing the demodulated output of a signal present on only one of said first and second legs to the further modulation means of said second leg, enabling recirculation and output utilization of said output signal via said second leg, output cross leg, demodulation means and feed back means until the appearance of the non-recirculated signal in the other of said legs.

5. A high-speed OR logic circuit according to claim 4 wherein the pump source connected to said first input leg has charactersitics identical to those of the pump source connected to said second input leg.

References Cited by the Examiner

UNITED STATES PATENTS

| | | | |
|---|---|---|---|
| 2,093,871 | 9/37 | Levin | 330—10 X |
| 2,346,020 | 4/44 | Gillespie | 330—10 |
| 2,455,332 | 11/48 | Hare | 330—10 |
| 2,775,740 | 12/56 | Oliver | 333—10 |
| 2,879,411 | 3/59 | Faulkner | 307—88.5 |
| 2,886,657 | 5/59 | Hirtreiter | 330—10 |
| 2,898,412 | 8/59 | Linn | 330—10 |
| 2,922,959 | 1/60 | Holloway et al. | 330—7 |
| 2,931,919 | 4/60 | Sacks | 307—88.5 |
| 2,948,863 | 8/60 | Honda | 333—10 |
| 2,956,234 | 10/60 | Olsen | 330—7 X |
| 2,980,861 | 4/61 | Popowsky | 330—10 |
| 2,999,228 | 9/61 | Facciola | 340—173 |
| 3,008,090 | 11/61 | Millis et al. | 330—10 |
| 3,017,613 | 1/62 | Miller | 340—173 |
| 3,061,681 | 10/62 | Richards | 330—7 X |
| 3,090,925 | 5/63 | Adler et al. | 330—10 X |

ROY LAKE, *Primary Examiner.*

GEORGE N. WESTBY, NATHAN KAUFMAN, *Examiners.*